(12) United States Patent
Desmet et al.

(10) Patent No.: US 9,578,803 B2
(45) Date of Patent: Feb. 28, 2017

(54) GUIDE MECHANISM OF A HARVESTING MACHINE

(71) Applicant: CNH AMERICA LLC, New Holland, PA (US)

(72) Inventors: Stefaan Desmet, Vosselare (BE); Stefaan Ballegeer, Beernem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/764,840

(22) PCT Filed: Jan. 29, 2014

(86) PCT No.: PCT/EP2014/051730
§ 371 (c)(1),
(2) Date: Jul. 30, 2015

(87) PCT Pub. No.: WO2014/118239
PCT Pub. Date: Aug. 7, 2014

(65) Prior Publication Data
US 2015/0351322 A1    Dec. 10, 2015

(30) Foreign Application Priority Data
Jan. 30, 2013 (BE) .................. 2013/0062

(51) Int. Cl.
*A01D 41/12*    (2006.01)
*A01D 61/00*    (2006.01)
*A01F 12/00*    (2006.01)

(52) U.S. Cl.
CPC ......... *A01D 41/1243* (2013.01); *A01D 61/00* (2013.01); *A01F 12/00* (2013.01)

(58) Field of Classification Search
CPC ............ A01D 41/1243; A01D 41/1252; A01D 43/006; A01D 61/00; A01F 12/40; A01F 12/444; A01F 15/04; A01F 12/00
USPC .................................... 460/111–114
See application file for complete search history.

(56) References Cited

U.S. PATENT DOCUMENTS

| | | | |
|---|---|---|---|
| 7,066,810 B2 * | 6/2006 | Farley ................ | A01D 41/1243 460/112 |
| 7,455,584 B2 | 11/2008 | Farley et al. | |
| 7,717,779 B1 * | 5/2010 | Weichholdt ........ | A01D 41/1243 460/112 |
| 7,896,732 B2 * | 3/2011 | Benes ................ | A01D 41/1243 460/112 |
| 2003/0114207 A1 * | 6/2003 | Wolters .................. | A01F 12/40 460/111 |
| 2008/0305841 A1 | 12/2008 | Overschelde et al. | |

* cited by examiner

*Primary Examiner* — Robert Pezzuto
(74) *Attorney, Agent, or Firm* — Patrick M. Sheldrake (57) ABSTRACT

A harvesting machine having a guide mechanism adapted to direct a flow of crop residue from a threshing mechanism along one of three paths corresponding with three respective processing modes, the guide mechanism having a first deflection door and a second deflection door. An actuator and a first resilient element are coupled to the deflection doors, such that all three processing modes can be attained by contraction and extension of the actuator.

11 Claims, 7 Drawing Sheets

GUIDE MECHANISM OF A HARVESTING MACHINE

This application is the US National Stage filing of International Application Serial No. PCT/EP2014/051730 filed on Jan. 29, 2014 which claims priority to Belgian Application BE2013/0062 filed Jan. 30, 2013, each of which is incorporated herein by reference in its entirety.

FIELD OF THE INVENTION

The present invention generally relates to a harvesting machine, and more specifically a combine harvester, having a threshing mechanism for separating harvested crop into grain and crop residue and a guide mechanism for directing the flow of crop residue from the threshing mechanism along one of three paths corresponding with a first, a second and a third processing mode of the harvesting machine. The guide mechanism therewith comprises two deflection doors being a first deflection door that is supported on a first pivot shaft fitted with a first crank arm and a second deflection door that is supported on a second pivot shaft fitted with a second crank arm, both deflection doors being movable between respective first end positions and second end positions, wherein
- in the first processing mode, both deflection doors are in their first end position;
- in the second processing mode, the first deflection door is in its first position and the second deflection door is in its second position;
- in the third processing mode, both deflection doors are in their second end position.

BACKGROUND OF THE INVENTION

A combine harvester of this type is described in detail in the European patent applications no. EP 1 529 434 and EP 2 000 018 which are incorporated herein by reference in their entirety. In these patent applications, crop residue directed along the first path is deposited in a swath on the ground for subsequent baling, that directed along the second path being comminuted by a chopper before being spread onto the ground and that directed along the third path being evenly spread over the ground by a spreader. Crop residue is directed to flow along the first path when both doors are in their first positions, along the second path when the first door is in its first position and the second door in its second position, and along the third path when both doors are in their second positions.

Figure 1A:
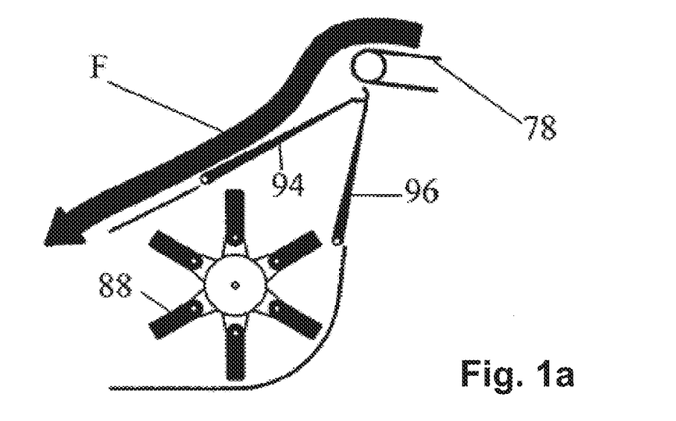
FIGS. 1A, 1B and 1C illustrate, as earlier described, schematic representations of the positions of the deflection doors of the guiding mechanism in the three possible processing modes of operation of the harvesting machine.
Figure 1B:
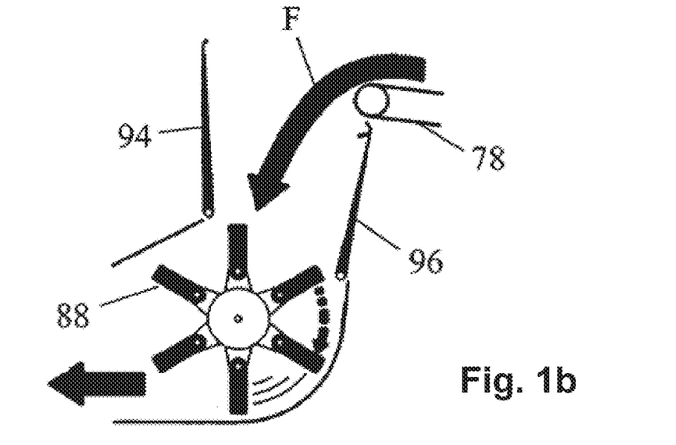
Figure 1C:
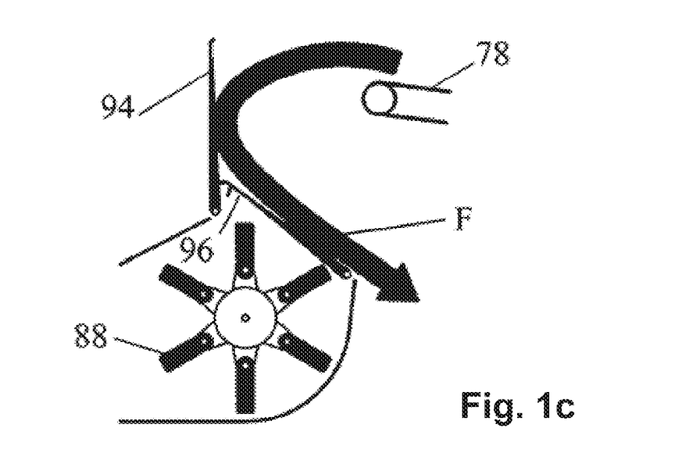

FIGS. 1A, 1B and 1C of the accompanying drawings represent schematically the positions of the doors of the guide mechanism as shown in FIGS. 4, 12 and 7 respectively of EP 1 529 434 and FIGS. 1A, 1B and 1C respectively of EP 2 000 018.

In FIG. 1A, the two deflection doors 96 and 94 are shown in their first positions corresponding to the first flow path, which is represented by the arrow F. In this position, the combine harvester is operating in its first processing or swathing mode. In this figure, the crop residue transported by the conveyer 78 passes over the second door 94 and is discharged as a narrow swath from the rear of the combine harvester.

In FIG. 1B, corresponding to the second flow path, the first door 96 is still in its first position but the second door 94 is moved to its second position to uncover the chopper 88. In this position, the combine harvester operates in its second processing or chopper mode. All the crop residue from the conveyer 78 is now funnelled into the chopper 88 in which it is comminuted before it is discharged onto the ground.

In FIG. 1C, corresponding to the third flow path, the two deflection doors 96 and 94 are in their second positions. In this configuration, the combine harvester operates in its third processing or spreader/corn mode. The raised second door 94 (also called the chop or swath door) prevents the crop residue from being discharged from the rear of the combine harvester, while the pivoting of the first door 96 (also called the deflector or kickback door) towards its second position prevents the crop from entering into the chopper 88. As a result, the crop residue follows a path that leads to a chaff spreader (not shown in the drawings) which distributes it evenly over the ground.

The focus of the present invention is the mechanism employed to move the two deflection doors and to hold them in position while the harvester is operating in any one of the three possible processing modes of the harvesting machine for processing the crop residue.

EP 1 529 434 teaches connecting each of the doors to a handle to enable the doors to be moved manually and it also proposes automatic positions of the doors, be it electronically, hydraulically or mechanically. Manual positioning of the doors is clearly the simplest and least expensive solution but some form of latching or locking mechanism is required to hold each of the two doors firmly in their end positions. Repositioning of manually operated doors in EP 1 529 434 therefore requires each of the handles to be separately unlatched before the doors are repositioned and latched after the doors have been moved to the desired position. In order to simplify the latching of manually operated doors in a combine harvester of the type described above so that, without intervention from the operator, each of the doors is held firmly against movement and vibration in each of its two end positions, in EP 2 000 018, a combine harvester is disclosed having a threshing mechanism for separating harvested crop into grain and crop residue, and a guide mechanism for directing the flow of crop residue from the threshing mechanism along one of three paths, the guide mechanism comprising two deflection doors that can each be moved between two end positions, wherein each of the doors of the guide mechanism is supported on a pivot shaft fitted with a crank arm and a resilient element connecting the two crank arms to one another in such a manner that each door, independently of the position of the other door, is urged by the resilient element to remain in one of two stable end positions and passing through an unstable over-centre position when moved from one stable end position to the other.

The problem of the combine harvesters as disclosed in EP 1 529 434 as well as in EP 2 000 018 is that the handles 94a and 96a still have to be turned manually by the operator to set the two doors 96 and 94 in the desired processing mode of the crop residue. Therefore, with this current design, the operator needs to leave the cab to switch from the different processing modes of the crop residue.

Therefore, there exists a need to be able to switch automatically and remotely between the different processing modes of a harvesting machine.

SUMMARY OF THE INVENTION

According to a first aspect of the invention, there is provided a harvesting machine comprising a guide mechanism adapted to direct a flow of crop residue from a threshing mechanism along one of three paths corresponding with three respective processing modes, the guide mechanism comprising a first deflection door which is supported on a first pivot shaft and fitted with a first crank arm and a second deflection door which is supported on a second pivot shaft fitted with a second crank arm, both deflection doors being movable between respective first end positions and second end positions. In the first processing mode, both deflection doors are in their first end position. In the second processing mode, the first deflection door is in its first position and the second deflection door is in its second end position. In the third processing mode, both deflection doors are in their second end position. The guide mechanism further comprises an actuator and a first resilient element. The actuator, at its first end coupled to the first crank arm and at its second end to the second crank arm, is arranged to vary the distance between its ends. The first resilient element is, coupled to the first crank arm such that:

when contracting the actuator in the first processing mode, the first resilient element exerts a force on the first deflection door in order to hold the first deflection door in its first end position and the second deflection door is brought to its second end position, and when contracting the actuator in the second processing mode, the actuator overcomes the force of the first resilient element in order to bring the first deflection door to its second end position while keeping the second deflection door in its second end position.

This configuration allows obtaining three different combinations of positions of the deflection doors corresponding to the three different possible processing modes of the crop residue using a single actuator. Such a configuration allows switching between the different processing modes in an automatic and remote controlled manner, without the need that the operator has to leave the cab of the harvesting machine.

The actuator and the first resilient element are coupled to the deflection doors in such a way that all three processing modes can be attained by contraction and extension of the actuator. The actuator and the first resilient element are preferably arranged such that when extending the actuator in the second processing mode, the first resilient element exerts a force on the first deflection door in order to hold the first deflection door in its first end position and the second deflection door is brought to its first end position, and when extending the actuator in the third processing mode, the actuator overcomes the force of the first resilient element in order to bring the first deflection door to its first end position while keeping the second deflection door in its second end position.

In an advantageous embodiment of a harvesting machine according to the invention, said guiding mechanism comprises a plurality of stop elements which are configured to define said first and second end positions of said deflection doors.

In a preferred embodiment of a harvesting machine according to the invention, the contraction state or position of the actuator is tracked to indicate the prevailing positions of said deflection doors. The contraction state may, e.g., be obtained from control software for the actuator. Optionally, the guide mechanism or the actuator itself comprises one or more position measurement sensors for tracking the contraction state or the positions of the deflection doors.

In a possible embodiment of a harvesting machine according to the invention, said harvesting machine comprises a frame, wherein said harvesting machine comprises a spreader assembly or spreader board which is adapted to spread the crop residue, said spreader assembly being pivotally movable with respect to the frame of the harvesting machine and being connected to said second crank arm by means of a linkage system, said pivoting movement of said spreader assembly being caused by the actuator through said linkage system together with the movement of said second deflection door, and wherein said guide mechanism comprises a second resilient element which is coupled to said spreader assembly and which is dimensioned in order to be able to at least compensate the weight of said spreader assembly.

In an advantageous embodiment of a harvesting machine according to the invention, the first resilient element on its outer end situated opposite to the end which is coupled to said first crank arm is attached to the frame of the harvesting machine.

Said first processing mode of the harvesting machine may correspond with a swathing mode, said second processing mode corresponds with a chopping mode and said third processing mode corresponds with a spreading mode. It is, however, to be noted that in a machine with the chopper and/or the spreader assembly in a different position, other positions of the first and second door will result in other modes of processing the crop residue. Furthermore, other processing modes than swathing, chopping and spreading may be used.

In a favourable embodiment of a harvesting machine according to the invention, the first and/or second resilient element comprises a spring.

In a more favourable embodiment of a harvesting machine according to the invention, said spring comprises a gas spring.

In a preferred embodiment of a harvesting machine according to the invention, said actuator is hydraulic, pneumatic or electric.

In an advantageous embodiment of a harvesting machine according to the invention, said harvesting machine comprises a control system that is adapted to determine the second position of the actuator and to store said determined second position into the controller of the harvesting machine.

In a preferred embodiment of a harvesting machine according to the invention, said harvesting machine comprises a driver's cabin, wherein said drivers cabin comprises control means in order to allow the operator of the harvesting machine to give a command to the guide mechanism in order to switch between said processing modes.

DETAILED DESCRIPTION OF EMBODIMENT(S)

In the present invention, as in EP 1 529 434, and as can be seen in the drawings 2A to 2C, 3A to 3C and 4A to 4C, each of the two deflection doors, i.e. a second deflection door (94) and a first deflection door (96), of a guide mechanism that deflects the crop residue in a combine harvester (1) along one of three different paths each corresponding a respective processing mode of the combine harvester, i.e. a swathing, a spreading and a chopping mode, are mounted on a respective pivot shaft, i.e. a second pivot shaft (94b) and a first pivot shaft (96b), that project beyond one side panel of the combine harvester (1). Each of the deflection doors (96, 94) therewith is movable in a counter clockwise direction between a first end position and a second end position and in a clockwise direction from the second to the first end. As can be seen in the drawings 2A to 2C, 3A to 3C and 4A to 4C, the first deflection door (96) is movable beneath a conveyer (78) for conveying the crop residue towards the guide mechanism. Preferably, as can be seen in FIGS. 2A to 2C, 3A to 3C and 4A to 4C, a plurality of stop elements (97) are provided that are affixed to the side panels of the frame of the combine harvester (1). In the embodiments of the combine harvester (1) as shown in FIGS. 3A to 3C and 4A to 4C, the first deflection door (96) is movable between a third stop element (97c) defining the first end position of the first deflection door (96) and the second deflection door (94) serving as the stop defining the second end position of this first deflection door (96). The second deflection door (94) is movable between a first and a second stop element (97a, 97b) defining the first and second end positions of the second deflection door (94). The first pivot shaft (96b) is fitted with a first crank arm (96c) and the second pivot shaft (94b) is fitted with a second crank arm (94c).

The present invention differs from the combine harvester as disclosed in EP 1 529 434 in the manner the movement of the deflection doors between their end positions during switching between the different processing modes is controlled.

As can be seen in FIGS. 2A to 2C, 3A to 3C and 4A to 4C, the guiding mechanism comprises an actuator (100) which at its one end (100a) is coupled with the first crank arm (96c) and at its opposite end (100b) is coupled with the second crank arm (94c). Said actuator (100) therewith is arranged to vary the distance between the outer ends (100a, 100b) thereof in at least a first, a second and a third distance corresponding to the above mentioned processing modes of the combine harvester (1). In order to vary the distance, the length of the actuator (100) is changed.

In order to determine the second distance of the actuator (100), preferably a control system is provided. This second position is then stored into the controller of the combine harvester (1). Said actuator (100) can be hydraulic, pneumatic or electric. Preferably, the contraction state or position of the actuator (100) is tracked to indicate the prevailing positions of said deflection doors (96, 94). The contraction state may, e.g., be obtained from control software for the actuator (100). Optionally, the guide mechanism comprises one or more position measurement sensors for tracking the contraction state of the actuator (100) and/or the positions of the deflection doors (96, 94). Such sensors may, e.g., be integrated in the stop elements (97). Optical sensors and contact sensors are examples of sensors that may be suitable for this purpose. The guiding mechanism furthermore comprises a resilient element (101) which, preferably at its one outer end (101a), is coupled to the first crank arm (96c). At its other opposite outer end (101b), said resilient element (101) is coupled to the frame of the combine harvester (1). Said resilient element (101) preferably is a spring, and more preferably a gas spring. Optionally, the stop elements (97) may comprise controllable electromagnets for keeping the deflection doors (96, 94) in the desired position even better. This may both be useful when operating the harvester (1) in one of the three processing modes as well as for keeping one of the doors (96, 94) in place during a transition between two processing modes.

Figure 2A:
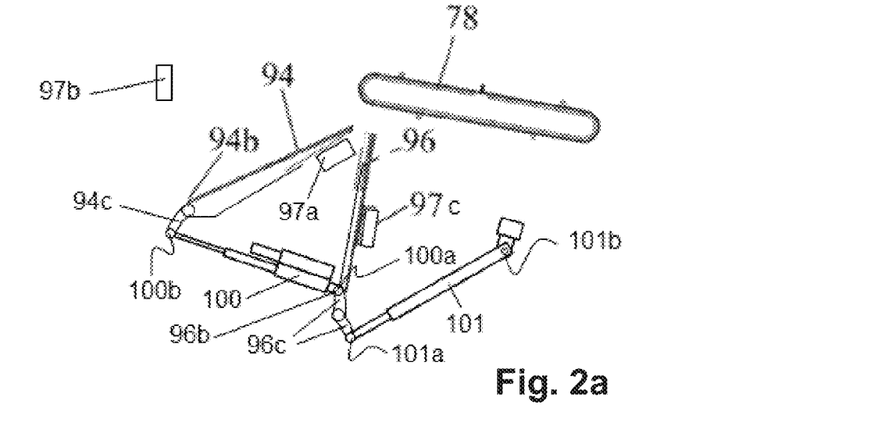
FIGS. 2A, 2B and 2C illustrate schematic representations of portion of a rear portion of a combine harvester, showing an actuator, which at its outer ends is coupled to crank arms to which the deflection doors are secured, and a spring which at its one outer end is coupled to the first deflection door, both when used to position the two deflection doors of the guide mechanism in the processing modes as shown in FIGS. 1A, 1B and 1C respectively.
Figure 2B:
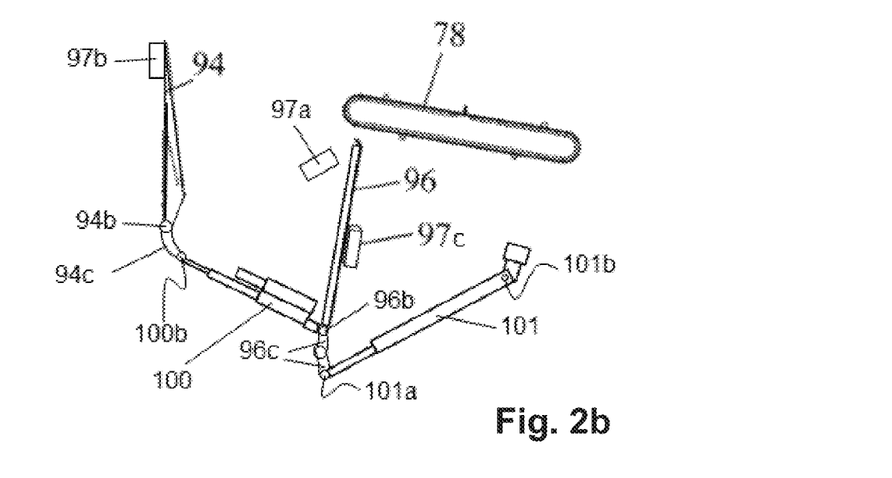
Figure 2C:
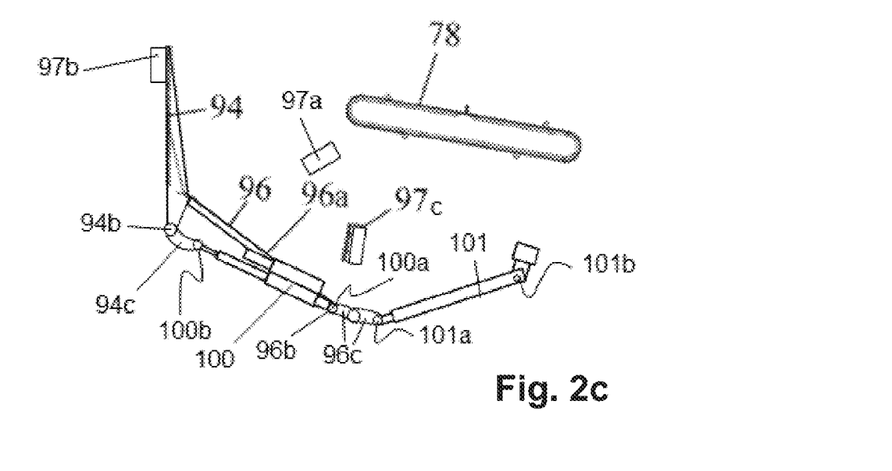

In FIG. 2A, the two deflection doors (96, 94) are in their first end positions, corresponding to the swathing mode represented by FIG. 1A. In FIG. 2B, the second deflection door (94) has been turned into the counter clockwise direction to its second end position while the first deflection door (96) is still in its first end position. The situation of FIG. 2B corresponds to the chopper mode which is also represented by FIG. 1B. In FIG. 2C, the two deflection doors (96, 94) are in their second end positions, which corresponds to the spreader mode of FIG. 1C.

The actuator (100) and the resilient element (101) are configured such that:

in order to switch the combine harvester (1) from the first processing or swathing mode to the second processing or chopping mode, the distance between the first and second ends (100a, 100b) of the actuator (100), i.e. the length of said actuator (100) is reduced. As a result, the second deflection door (94) moves from its first end position to its second end position and an entrance for the crop residue to the chopper (88) is provided. During and after the contraction, the resilient element (101) exerts a force on said first deflection door (96) in order to hold said first deflection door (96) in its first end position without changing the distance between the ends (101a, 101b) of said resilient element (101); The entrance to the spreader thus keeps closed.

in order to switch the combine harvester (1) from the second processing or chopping mode to the third processing or spreading mode, the distance between said first and said second ends (100a, 100b) of said actuator (100) is reduced further. During this length reduction of the actuator (100), the second deflection door (94) stays in its second position while the actuator (100) overcomes the force generated by the resilient element (101). As a result the distance between the ends (101a, 101b) of this resilient element (101) is reduced and the first deflection door (96) is moved from its first end position to its second end position, thereby blocking the entrance to the chopper (88) and opening the entrance to the spreader.

Vice versa, in order to switch the combine harvester (1) from the third processing or spread mode to the second processing or chopping mode, the distance between the ends (100a, 100b) of said actuator (100) is increased. During the expansion of the actuator (100), the resilient element (101) assists the actuator (100) in moving only the first deflection door (96). The length of said resilient element (101) is increased such that said first deflection door (96) is moved from its second end position to its first end position while the second deflection door (94) is kept in its second position.

in order to switch the combine harvester (1) from the second processing or chopping mode to the first processing or swathing mode, the distance between the ends (100a, 100b) of said actuator (100) is increased even further, also moving the second deflection door (94) from its second end position to its first end position. During this part of the expansion of the actuator (100) the first deflection door (96) rests against one of the stop elements (97c) and stays in its first end position. The distance between the ends (101a, 101b) of this resilient element (101), and thus its length, therewith remaining unchanged.

Figure 3A:
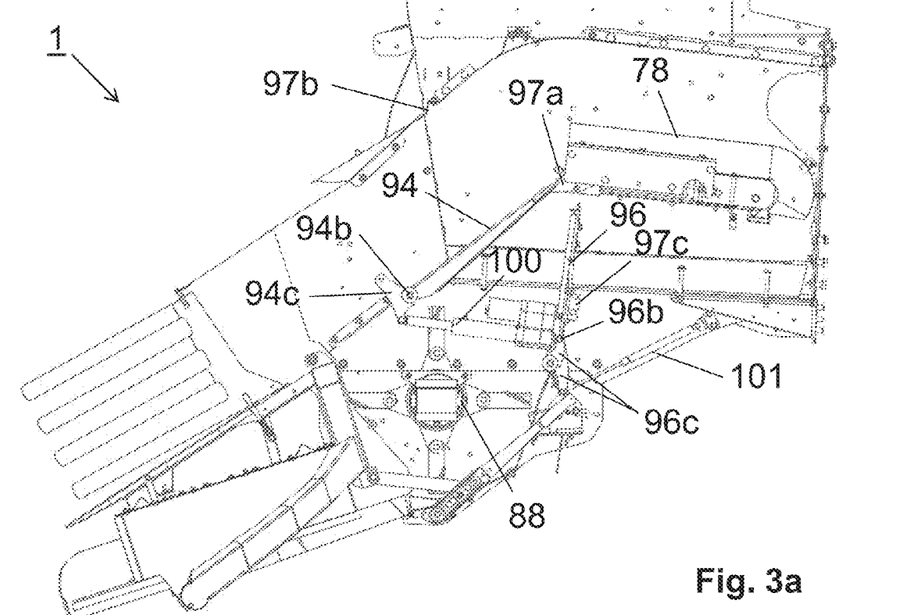
FIGS. 3A, 3B and 3C illustrate schematic representations of a rear part of a combine harvester having a spreading mechanism for actively spreading the crop residue in a swathing mode, a chopping mode and a spreading mode, respectively.
Figure 3B:
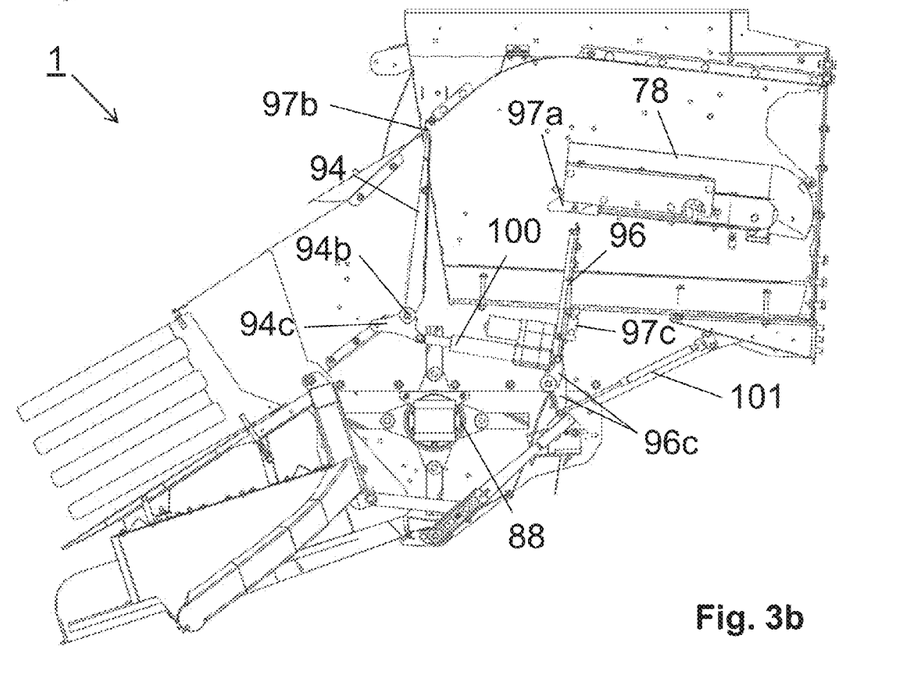
Figure 3C:
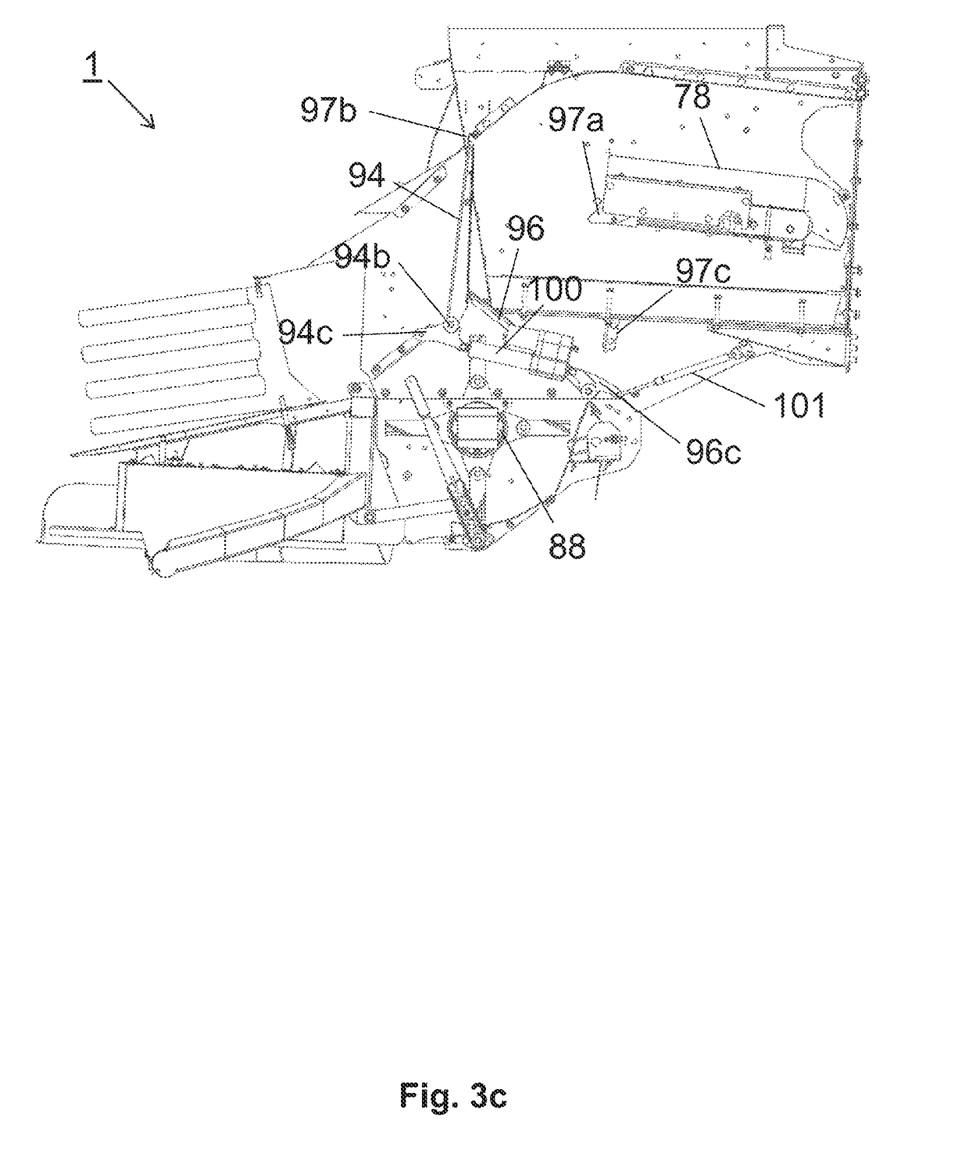
Figure 4A:
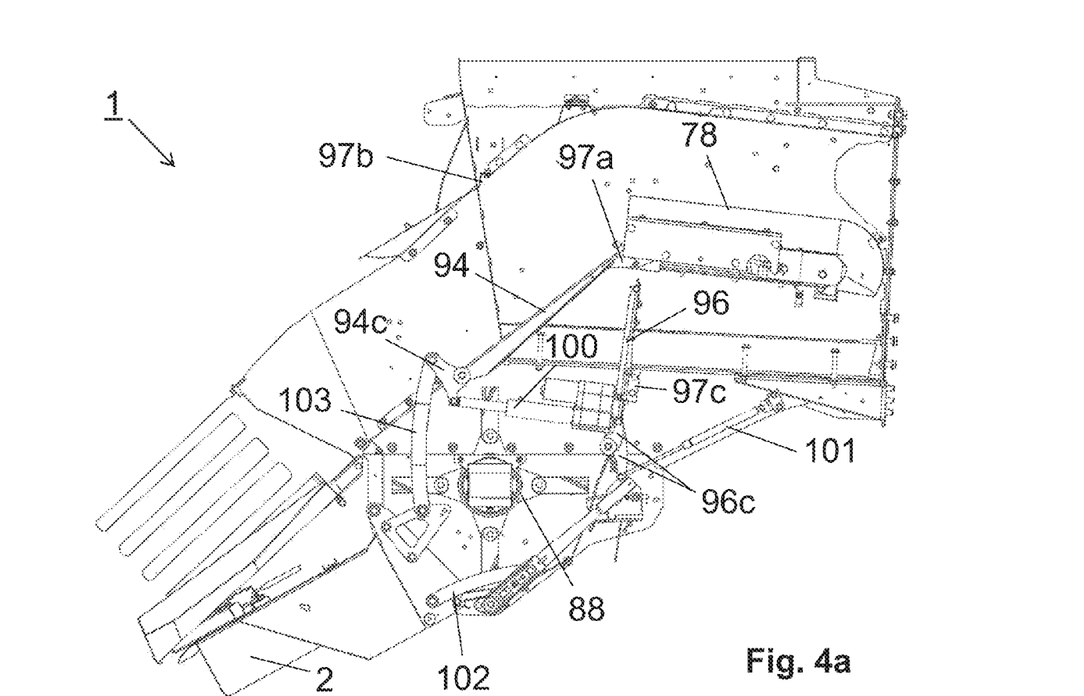
FIGS. 4A, 4B and 4C illustrate schematic representations of a rear part of a combine harvester having a spreader hood for passively spreading the crop residue in a swathing mode, a chopping mode and a spreading mode, respectively.
Figure 4B:
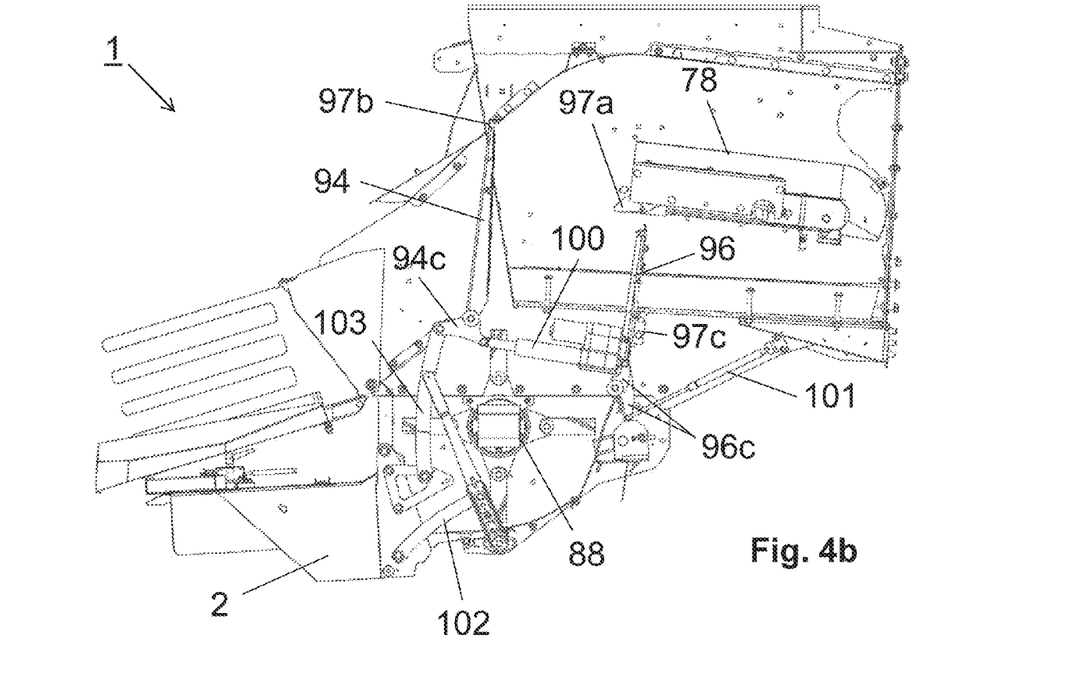
Figure 4C:
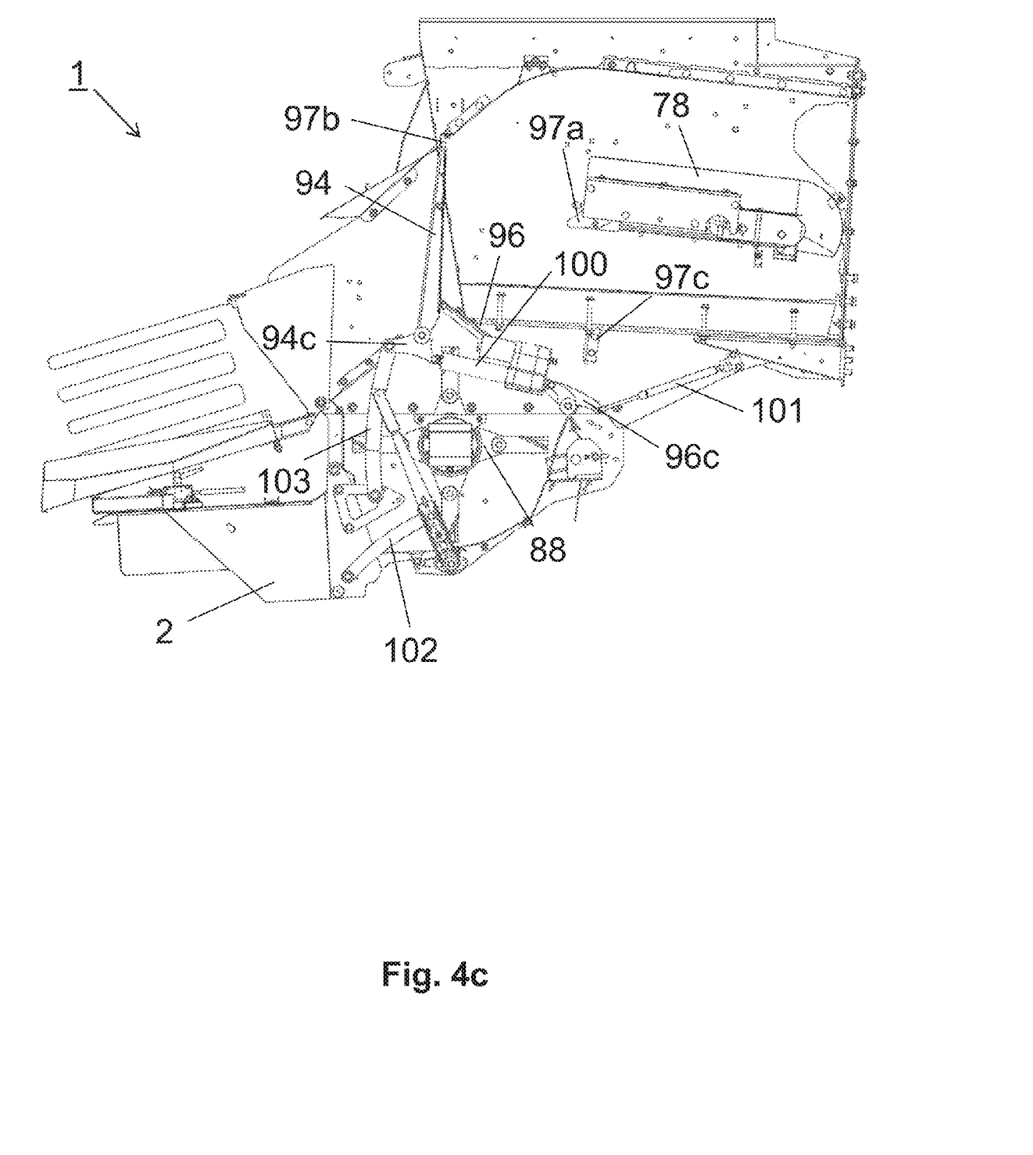
Figure 5:
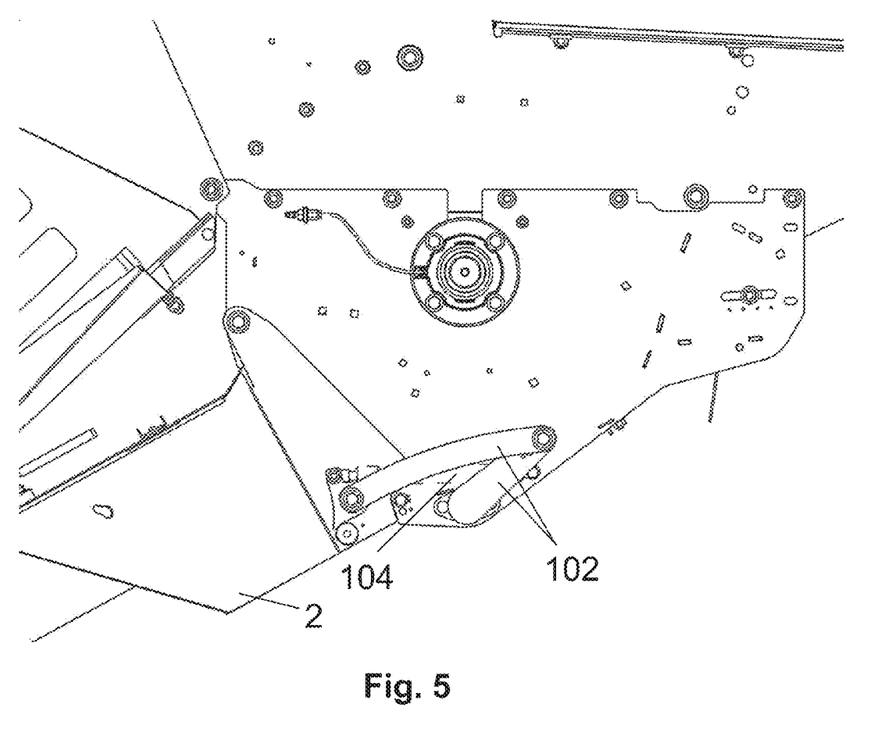
FIG. 5 illustrates a schematic representation portion of a rear part of a combine harvester as shown in FIGS. 4A to 4C, showing the second spring which is dimensioned in order to be able to at least compensate the weight of the spreader hood.
Figure 6:
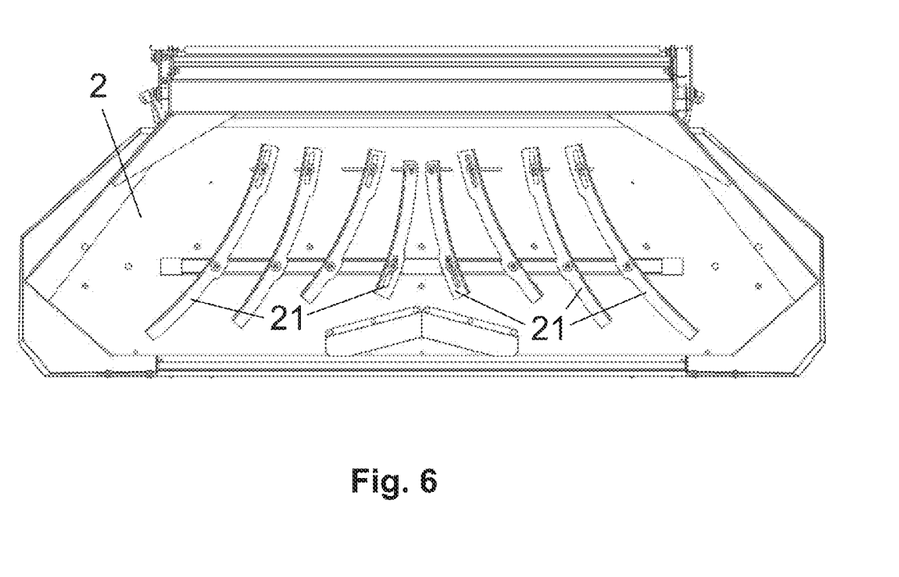
FIG. 6 illustrates a schematic representation of a bottom view of the rear part of the combine harvester as shown in FIGS. 4A to 4C and FIG. 5.

In FIGS. 3A to 3C, part of a combine harvester (1) is shown having an active spreading mechanism. In FIGS. 4A to 4C, a combine harvester (1) is shown having a passive spreading mechanism comprising a spreader hood (2). This spreader hood can be seen in more detail in FIG. 6. This spreader hood (2) comprises a number of deflectors (21) in order to evenly spread the crop residue on the field. This spreader hood (2) is pivotally movable with respect to the frame of the combine harvester (1) by means of a linkage system (102). This spreader hood (2) furthermore is connected to the second crank arm (94c) by means of a linkage system (103) (see FIGS. 4A to 4C). The pivoting movement of the spreader hood is caused by the actuator through this linkage system (103) together with the movement of the second deflection door (94) between its first and its second end position. As can be seen in FIG. 5, the guide mechanism furthermore comprises a second resilient element (104), preferably a spring and more preferably a gas spring, which is coupled to the spreader hood (2) via arms (102) and which is dimensioned in order to be able to at least compensate the weight of the spreader hood (2).

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A harvesting machine comprising
a guide mechanism adapted to direct a flow of crop residue from a threshing mechanism along first, second and third paths corresponding with first, second and third respective processing modes,
the guide mechanism comprising:
a first deflection door supported on a first pivot shaft and fitted with a first crank arm and a second deflection door supported on a second pivot shaft fitted with a second crank arm, the first deflection door movable between first and second end positions of the first deflection door and the second deflection door movable between first and second end position of the second door,
an actuator coupled at a first end to the first crank arm and at a second end to the second crank arm, and arranged to vary the distance between the first and second ends of the actuator; and
a first resilient element, coupled to the first crank arm such that when contracting the actuator in the first processing mode, the first resilient element exerts a force on the first deflection door to hold the first deflection door in a first end position of the first deflection door and the second deflection door is brought to a second end position of the second deflection door,
wherein in the first processing mode, the first deflection door is in the first end position of the first deflection door and the second deflection door is in the first end position of the second deflection door; in the second processing mode, the first deflection door is in the first end position of the first deflection door and the second deflection door is in the second end position of the second deflection door; and in the third processing mode, the first deflection door is in second end position of the first deflection door and the second deflection door is in the second end position of the second deflection door;
wherein when contracting the actuator in the second processing mode, the actuator overcomes the force of the first resilient element in order to bring the first deflection door to the second end position of the first deflection door while keeping the second deflection door in the second end position of the second deflection door.

2. A harvesting machine according to claim 1, wherein the actuator and the first resilient element are arranged such that when extending the actuator in the second processing mode, the first deflection door is kept in the first end position of the first deflection door while the second deflection door is brought to the first end position of the second deflection door, and when extending the actuator in the third processing mode, the first resilient element assists the actuator in bringing the first deflection door to the first end position of the first deflection door while keeping the second deflection door in the second end position of the second deflection door.

3. A harvesting machine according to claim 1, wherein said guiding mechanism comprises stop elements configured to define said first and second end positions of said first and second deflection doors.

4. A harvesting machine according to claim 1, wherein the guide mechanism comprises a sensor for determining a contraction state of the actuator or a position of the ends of the actuator.

5. A harvesting machine according to claim 1, further comprising a frame and a spreader assembly adapted to spread the crop residue, said spreader assembly being pivotally movable with respect to the frame and connected to said second crank arm by a linkage system, said pivoting movement of said spreader assembly caused by the actuator through said linkage system together with the movement of said second deflection door, and said guide mechanism comprises a second resilient element which is coupled to said spreader assembly and which is dimensioned in order to be able to at least compensate the weight of said spreader assembly.

6. A harvesting machine according to claim 1, wherein an outer end of said first resilient element is situated opposite to the first end of the actuator and coupled to the first crank arm is attached to a harvester frame.

7. A harvesting machine according to claim 1, wherein said first processing mode corresponds with a swathing mode, said third processing mode corresponds with a spreading mode and said second processing mode corresponds with a chopping mode.

8. A harvesting machine according to claim 1, wherein said resilient element comprises a spring.

9. A harvesting machine according to claim 8, wherein said spring comprises a gas spring.

10. A harvesting machine according to claim 1, wherein said actuator is hydraulic, pneumatic or electric.

11. A harvesting machine according to claim 1, further comprising a drivers cabin, the drivers cabin comprises a control input to allow the operator of the harvesting machine to give a command to the guide mechanism in order to switch between said processing modes.

\* \* \* \* \*